March 4, 1941.  K. M. JONES  2,234,157
NUT CRACKING
Filed Aug. 7, 1937  4 Sheets-Sheet 1

FIG.1.

INVENTOR
KARL M. JONES
BY
Arton and Griswold
ATTORNEYS

March 4, 1941.  K. M. JONES  2,234,157
NUT CRACKING
Filed Aug. 7, 1937   4 Sheets-Sheet 2

INVENTOR
KARL M. JONES
BY
Orton and Griswold
ATTORNEYS

March 4, 1941.   K. M. JONES   2,234,157
NUT CRACKING
Filed Aug. 7, 1937   4 Sheets-Sheet 3

INVENTOR
KARL M. JONES
BY
Orton and Griswold
ATTORNEYS

March 4, 1941.   K. M. JONES   2,234,157
NUT CRACKING
Filed Aug. 7, 1937   4 Sheets-Sheet 4

INVENTOR
KARL M. JONES
BY
Orton and Griswold
ATTORNEYS

Patented Mar. 4, 1941

2,234,157

UNITED STATES PATENT OFFICE 2,234,157

NUT CRACKING

Karl M. Jones, Montclair, N. J.

Application August 7, 1937, Serial No. 157,869

26 Claims. (Cl. 146—9)

This invention is directed to a method and apparatus for dehusking and cracking certain varieties of palm nuts to separate the shells from the kernels. This process and apparatus are particularly useful in connection with the treatment of nuts of the cohune variety.

These nuts as grown, come in very large clusters of several hundred nuts with each individual nut covered by a fibrous husk which can be removed with comparative ease. The shell proper of these nuts, however, is extremely hard and attempts heretofore made to remove the shells without severely crushing or bruising the internal kernel or meat or mashing the meats with broken pieces of shell have attained little success.

The shells are extremely hard and withstand a great deal of force. When they are "wet," that is, as gathered, it is practically impossible to crack the shells without crushing the entire nut. When this happens, it is difficult, if not impossible, to separate the kernels or meat from the shell and since the principal product is the kernel from which valuable oils are extracted, these are lost when the nuts are crushed thereby making separation of the oil containing kernel and the shell impossible.

Many tropical palms produce crops of nuts which, it has been recognized, contain kernels having a high content of valuable oils that are substantially odorless, colorless, and tasteless. These oils can be commercially used for soaps, butter substitutes such as oleomargarine, cooking and salad oils, baker's syrup, candy making, tinplate flux, and the like, but heretofore no commercial process has been devised by means of which the kernels could be separated from the shells in an expeditious manner. Among the nuts to which this invention may be applied and particularly those which have extremely hard and substantially unbreakable shells are those known as cohune or cahone, babassu, corozo and coquito. In addition to these there are certain sub-varieties of the general classes just mentioned and also other nuts having local names depending upon the region in which they grow. These include coyol, cokerite or cocorito, as well as manaca and others. In this specification these nuts are referred to generically as palm nuts of the cohune variety although some of them might not be within a strict definition of cohune nuts. The various species of nuts just listed vary in size from about one inch long up to about three and four inches long or even slightly more. The babassu being in the latter group. Many of these nuts have a single pocket and a single kernel therein while others, as for example, the babassu, have from three to seven kernels separated by membranes extending across the nut from one wall to another so that there are, in effect, several small pockets. Because of these varying structures it has not been practicable heretofore to use any specific type of mechanism for separating the shells from the kernels.

All of these nuts are characterized by a very hard tenacious, woody shell, the physical properties of which vary according to the condition of the nuts. Although these shells are quite thick compared to the size of the kernel and stone-like in appearance and reaction, they can be broken if sufficient force is applied. Attempts heretofore made to crack these nuts have been unsuccessful because when sufficient force has been applied to break the shell it has been done with a crushing action that transmitted the force applied to the shell to the kernel which was likewise crushed and damaged and in many instances badly mashed with the shell. As a result, the separation of whole kernels was impossible and the crushed or damaged kernels when shipped underwent rapid deterioration by becoming rancid and there was a substantial loss of the valuable oil in the kernel.

This problem is accentuated if attempts are made to crack the nuts shortly after they are gathered. The nuts are generally ripe but are what is known as "wet." In this condition, it is impossible by the methods heretofore practiced to crack these nuts without substantially mashing the kernel. When, however, the nuts have been seasoned by a drying treatment extending over a long period, the shells can be broken somewhat more readily than when "wet" but even in this condition no commercially practicable process for separating the kernels from the shells has been devised. Attempts have also been made to dry these nuts rapidly by high temperature treatments but this has not to any great extent assisted in the solution of the problem.

The problems in connection with the cracking of such nuts have been increased because of the fact that various nuts within this class differ greatly in size, shape and kernel arrangement. Various mechanical devices have been suggested for cracking these nuts when dry but despite very complicated arrangements, have not proved successful. This is, to a certain measure, due to the variations in the size and structure of the nuts of any given kind or class and also to their inherent hardness. Another factor is that nuts which appear to be uniform on the outside may differ greatly in the number of kernels, their relative sizes and arrangements. Likewise, nuts of a given class may vary from time to time depending upon whether or not they are ripe or green, dry or "wet." Wet nuts cannot be cracked in their natural condition but simply crushed or mashed, and since the nuts are grown, gathered, and generally cracked in the warm, humid, tropical climates they remain wet despite efforts made to dry them. Nuts on the ground gather additional moisture and the husk retains it.

After ripening on the trees the nuts fall to the ground where they may lie for a year or two before they are gathered during which time they do not lose any moisture but may actually pick up some.

I have discovered a method and devised an apparatus whereby all of the nuts of this general class can be readily cracked in a very simple and expeditious manner and wherein the variations in size or structure of the individual nuts or their physical condition, i. e., whether or not they are wet or dry, makes little or no difference in the process. That is, if the nuts are properly conditioned before it is attempted to crack the shells, this cracking operation can be readily accomplished without in any manner damaging the kernels. When the nuts are gathered they will be wet although they are ripe. Wet nuts have very tough shells of great inherent tenaciousness and some elasticity resulting in transmitting shocks applied to the shell directly to the kernel and exerting crushing pressure. Attempts heretofore made to crack wet nuts resulted simply in crushing the entire nut since the shell has no frangibility. In the case of dry nuts the shell is slightly more brittle but force applied to the surface of the shell is transmitted to the kernel as the shell is broken. This conditioning process can be applied to nuts which are ripe or green, wet or dry. In practice, the nuts should all be ripe because the oil content of green nuts is substantially lower than in the case where the nuts have ripened, but the physical condition of the nuts, i. e., with respect to wetness or dryness, is immaterial when applying this process.

Conditioning of the nuts involves embrittling the shells, i. e., making them more frangible. This is accomplished by developing what is believed to be a crystalline formation in the shell so that it is less resistant to shock and becomes rigid through the setting up of strains and stresses within the shell. Coincident with this there is a separation of the kernel from the shell proper so that the bond between the surface covering of the kernel and the socket lining is broken throughout substantially the entire contacting surfaces. In some cases, a nut which when shaken gave forth no sound, after the conditioning treatment, produced a rattling sound indicating a separation of the shell from the kernel. This works to the advantage of the process when the nuts are cracked. Likewise the conditioning treatment makes the kernels shock resistant so as to retain their shape when the cracking forces are applied to the shell.

Nuts which have been conditioned to produce the characteristics above described are readily shattered and yet the whole kernels can be separated from the shells in a very easy and expeditious manner.

If desired, my process can be carried out in a continuous manner by employing apparatus such as, for example, that illustrated in the accompanying drawings.

This process contemplates the preliminary conditioning treatment of the nuts before they are subjected to suitable cracking forces for shattering the shell. To this end, the nuts, whether in a dry or wet condition, are cooled. When the nuts have been thus cooled, the kernels, which prior to the cooling might have been firmly embedded in the shells, are loosened so that many cooled nuts when shaken produce a rattling sound positively indicating that the kernel has been loosened from its socket. This observable physical separation of the kernel from the shell is incidental since even if the kernel still is firm in its socket, the conditioned nut can be cracked without damaging the kernel which has broken its bond with the socket lining or weakened it. The treatment applied to the nuts definitely affects the kernels. Ordinarily they are relatively quite soft and readily exude the oil they carry in such large proportions. After conditioning, the oil is congealed without embrittling the fibrous structure so that they can withstand the breaking shock applied to the shell and retain their form free from bruising. When the nut has been cooled to the desired temperature, it is in a condition such that a relatively slight blow will readily shatter the extremely hard, resistant shell. A relatively slight shock will accomplish this without in any manner damaging the kernel, which is separated from the shell in its whole form and not crushed, bruised, or mashed as in the methods heretofore employed. The cracked shells and the free kernels may be separated by any of a number of known means or by the means hereinafter described and illustrated.

The details of this process will be described in connection with a discussion of the apparatus illustrated in the accompanying drawings but it should be borne in mind that the apparatus shown while convenient for carrying out the process is not essential thereto and other forms of apparatus could be employed. Likewise changes may be made in the details of this apparatus or of the process without departing from the spirit and scope of the invention.

Referring to the drawings.

The invention will be described particularly with reference to cohune nuts, although it is to be understood that this is simply an exemplification of the process which may be applied to other nuts of similar types as described above. Cohune nuts grow in large bunches and each of the individual nuts are covered with a husk or pericarp, which can be readily removed and this may be done at the source of the nut.

Figure 6:
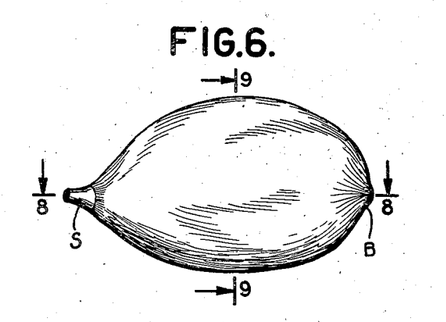
Figure 6 is a view in elevation of a cohune nut with the husk or pericarp thereon.

In Figure 6 is illustrated a nut of the cohune variety with the husk intact and showing the stem S.

Figure 7:
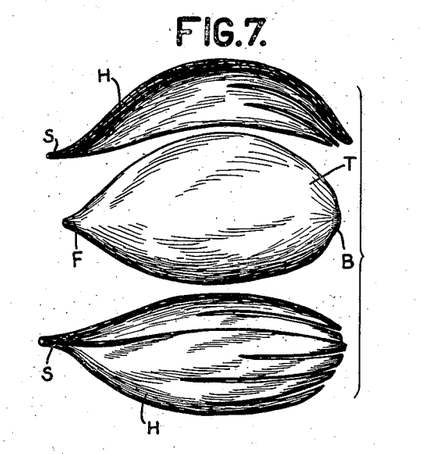
Figure 7 is an exploded view showing a nut with a portion of the removed husk below and another portion of the removed husk above, in section.

The removal of the husk is attained in the manner described and usually the husk H (Figure 7) is removed in one or two pieces usually frayed at the end opposite the stem S. Relatively speaking, the husk is not very thick, but has a hard outer surface and a somewhat fleshy pulp-like oil bearing inner surface in contact with the shell T.

Figure 8:
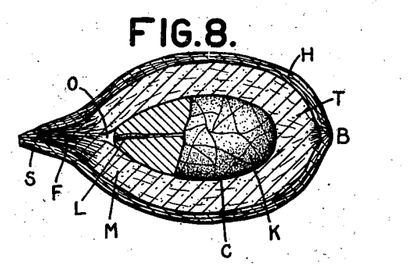
Figure 8 is a view in cross-section along the line 8—8 of Figure 6.
Figure 9:
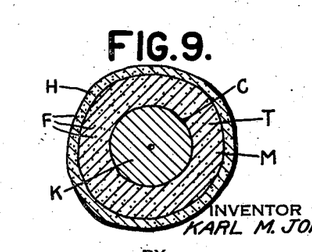
Figure 9 is a view in cross-section along the line 9—9 of Figure 6.

The structure of the entire nut is best illustrated in Figure 8 which shows the nut in longitudinal cross-section. It includes the outer husk H, the thick hard stone-like shell T surrounding and tightly fitting over the kernel K. The shell T is composed of a relatively large number of fibers F which, at the stem end, are not joined in any manner but have somewhat the appearance of a brush. These fibers extend the entire length of the nut from the stem to the base B but for the greater portion of their length are firmly encased in a hard, rather fibrous, material M which, with the long fibers F, give the shell T great strength. The kernel K is covered by a brown covering C that, in fresh nuts, fits tightly against the kernel socket in the shell T but when the nut is conditioned the varying relative expansion and contraction of the kernel and shell results in freeing the kernel from the socket of the shell T. In this process for shelling the nuts, the kernels are separated without any substantial breaking of the covering C which can, therefore, protect the oils in the kernel from oxidation, exudation and becoming rancid. At one end of the kernel K is the seed L. This seed is near a slight recess O in the fibrous portion, that is, closed to the outside by the brush-like formation of fibers F and it is through this opening O and the fibers F at the stem end S of the nut that the sprout from the nut grows when conditions are favorable. The kernel is substantially solid except for a very slight cavity along its center the size of which varies with the condition of the nut, being substantially non-existent in a fresh nut and increasing in size as the nut ages and seasons. The kernel K contains from about sixty-five to over seventy percent of a solid white fat which in its composition and properties closely resembles cocoanut oil and melts at about room temperature.

Figure 10:
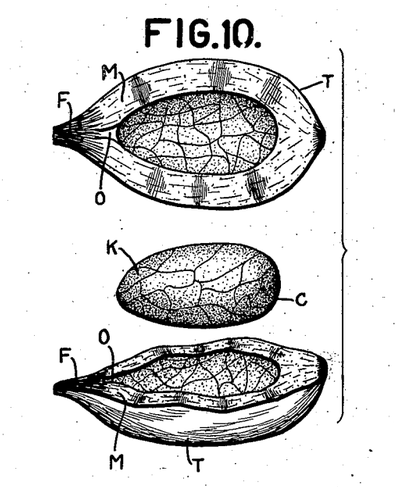
Figure 10 is an exploded view of the broken shell and the freed kernel.

When the nuts are cracked or shelled according to the teachings of this invention, they usually break into two substantially equal halves along a longitudinal plane as is best seen in Figure 10. The break is, in most instances, irregular and jagged but clean and the kernel in a conditioned nut readily drops from the socket. In the case of multiple kernel nuts the membranes separating the several kernels are also broken sufficiently to permit the kernels to free themselves from the shells.

It is usually desirable to remove the husks before conditioning the nuts prior to cracking and conveniently this may be done with the apparatus shown in Figure 2 for cracking the nuts in a manner hereinafter to be described.

The conditioning and cracking process herein described is applied after the husk has been removed although this is not essential but simply preferable to avoid applying the treatment to the husk, which is unnecessary. The dehusked nuts to which this process is applied may be either green, i. e., not completely ripened, ripened, dry or physically wet. All of these conditions attain in the commercial handling of these nuts but no particular care need be exercised when following the teachings of this invention to insure that the nuts are in any particular physical condition or uniform condition, although it is preferable that the nuts be reasonably ripe in order that the greatest amount of highest grade oil may be extracted from the kernels.

The first step in the treatment of the nuts after the husk has been removed involves cooling the nuts to a temperature which sets up stresses and strains in the shells thereby making them frangible or embrittled and at the same time congeals the oil in the kernels to strengthen them so they can withstand the shock of cracking the shell which, of course, is transmitted in varying degrees to the kernel.

The controlling factors for conditioning the nuts will, of course, vary within certain limits depending upon the particular nut, its type, degree of ripeness, moisture content, etc., but there are general operations applicable to all those of the class described subject to minor variations in details. For example, when slightly dried, cohune nuts were subjected to temperatures from below 32° F. to well below 0° F. the nuts could be readily cracked. At higher temperatures a longer time interval to insure complete cooling of the nut was essential. At the lower temperature a shorter time was sufficient, and in the case of old, very dry nuts was essential because too long exposure to reduce temperatures made the kernels brittle and when the shells were cracked the kernels frequently shattered. On the other hand, short exposures to very low temperatures, solid carbon dioxide, embrittled the shell but frequently did not properly harden the kernel to withstand the shock of cracking or upon extended exposure to such low temperatures made it too brittle. By proper time, temperature, and heat transfer control, a wide range of subfreezing temperatures can be employed. In practice, the most successful temperature range for extended exposure, i. e., noncritical time factor, was from slightly below 0° F to about 20° F. For fresh wet nuts substantially lower temperatures are preferred, specifically below 0° F. to —20° F. and in some instances even lower. Within this range the shell and kernel reach a state of equilibrium, for maximum effectiveness in cracking. The shell is slightly contracted, in outside dimensions as well as in wall thickness, the total effect of which is to increase the size of the kernel cavity, strains and stresses are set up within the shell and it is in a condition such that the proper type of blow applied to it will produce a clean longitudinal break usually to form two nearly equal halves. At the same time the kernel has been changed from its pulpy condition in tight contact with the walls of the cavity to a harder yet not brittle condition and slightly spaced from the walls. As a general rule the actual temperature of the kernels for greatest efficiency in cracking is somewhat higher than the shell. This state is attained in practice because the shell, while being cooled, serves as an insulation for the kernel and except by keeping the nuts at a particular low temperature for a very long time, the shell would be colder than the kernel.

Figure 1:
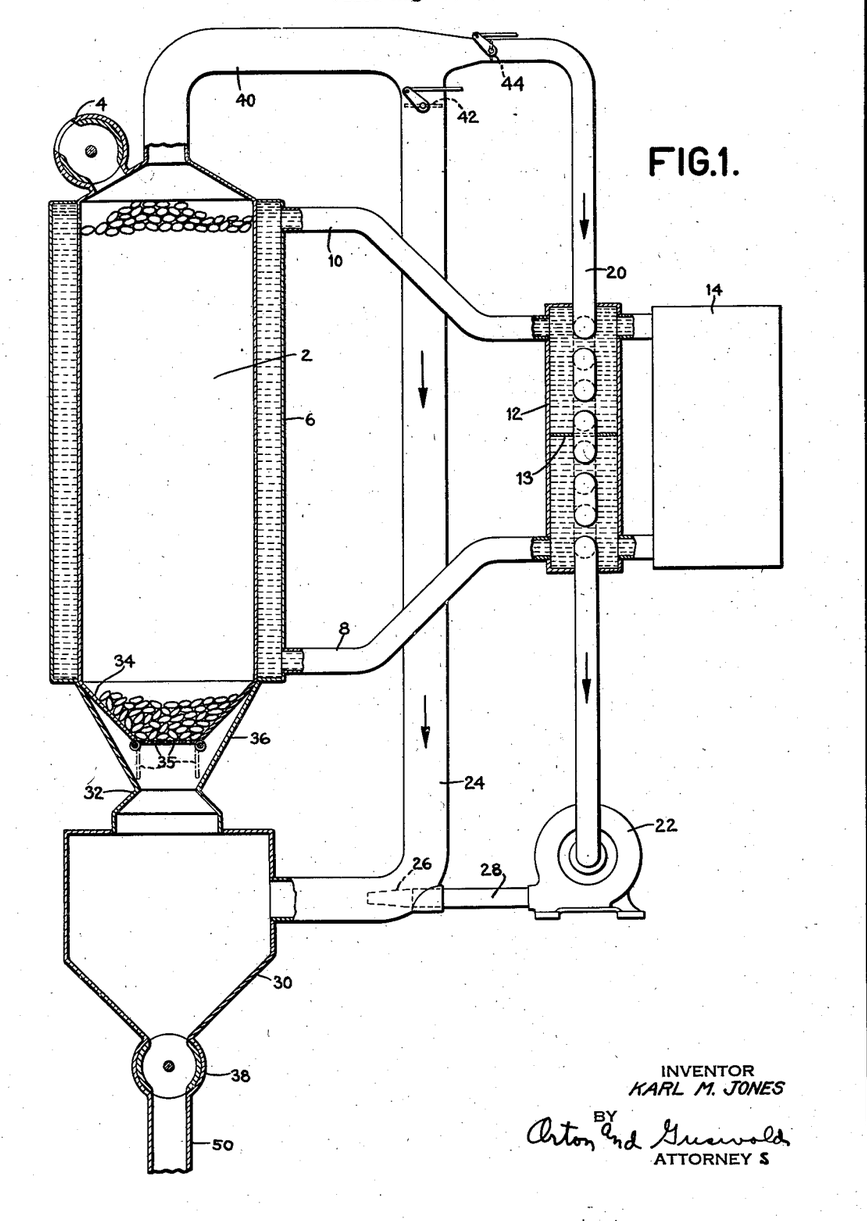
Figure 1 is a view in elevation with parts broken away to show sections of various details of a conditioning apparatus.

To accomplish this conditioning the nuts may be introduced into a chamber 2 (Figure 1) through a gas tight feed valve designated generally at 4. If desired, the nuts may be fed to the feed valve 4 from a hopper, not shown, or any means for feeding the nuts may be employed, provided care is taken that the cool gases within the chamber 2 are not permitted to escape freely through the nut feeding mechanism. In practice, the nuts may be fed either continuously or in individual batches. At any rate, the chamber 2 is substantially filled with the nuts as is indicated in the drawings. This chamber 2 comprises, as illustrated in Figure 1, a cylindrical member provided with a jacket 6 through which a cooling fluid may be passed. Conveniently the cooling fluid may be a refrigerated brine introduced at the bottom of the cylindrical chamber through the pipe 8. In this manner, the colder brine is brought adjacent the nuts which are about to be discharged and therefore the nuts will be coldest at their point of discharge from the cooling chamber 2. Near the top of the cooling chamber is a pipe 10 through which the brine may be withdrawn and conveyed to a heat exchanger 12 and a refrigeration apparatus 14 which latter may be of any conventional type commonly employed for cooling brine. In the refrigeration apparatus 14 the brine is again cooled then recirculated by passing it back to the jacket of the chamber 2 through the inlet pipe 8. By the means just described it will be seen that the cylindrical chamber 2 is kept under controlled low temperature conditions by the continuously recirculating brine. If desired, positive circulation of the brine may be insured by a pump or the like although convectional circulation is sufficient in most instances. Alternatively, there may be direct expansion of a refrigerating medium within the jacket 6. In some instances the jacket may be dispensed with entirely by substituting suitable heat insulating material and cooling the nuts solely by the recirculated gas in the manner to be described.

The heat exchanger 12 is shown as a relatively larger container for the brine through which a coiled pipe 20 is passed in order that the air which is circulated through the pipe 20 will be in contact with the cooled pipe section for a relatively long time. Conveniently, the heat exchanger 12 may be divided by a central wall 13 passing horizontally through the heat exchanger. In this manner, the returning brine coming through the pipe 10 will not be mixed with the brine passing through the pipe 8 into the chamber 2 without going through the refrigerating apparatus 14. In many instances the separating wall is not necessary but may be desirable. At any rate, the air passing through the pipe 20 by the suction created by the fan or blower 22 is cooled during the time that it goes through the heat exchanger apparatus 12. In this case also the relatively warm air meets the warmer brine near the entrance to the pipe 10 and is cooled by it a certain amount until it reaches the lower part of the heat exchanger 12 when it comes in contact with cooler brine and is likewise further cooled before it is drawn through the blower or fan 22 and passed into the larger pipe 24 at the nozzle 26 which is at the end of a pipe 28 connecting the blower or fan 22 with the said nozzle 26. Due to the action of the blower or fan 22 the air is introduced into the pipe 24 from the nozzle 26 under an increased pressure and its expansion at the nozzle 26 causes a suction in the pipe 24 and draws the air in the pipe 24 in the direction indicated by the arrows. In this manner the very cold air coming from the nozzle 26 is mixed with slightly warmer air from the pipe 24 and a complete mixture is obtained within the mixing chamber 30 until all of the air is at a substantially uniform temperature when it rises through the turbulence throat 32 and passes up into the chamber 2. It will be understood that various modifications in duct and pipe arrangements can be made without departing from the principles of the invention.

The nuts in the chamber 2 are supported on a screen 34 which is hopper shaped with a flat bottom closed by hinged members 35 that may be held either in a horizontal or vertical position by handles passing through the conically shaped portions 36 in the lower part of the chamber 2. The hinged members of the screen 34 may be actuated to retain or discharge the cooled nuts from within the chamber 2 into the mixing chamber 30 from which they may be discharged by the gas-tight feed valve 38 in a manner similar to that described in connection with the feed valve 4 at the top of the chamber 2.

Cooled gases rising through the turbulence throat 32 flow through the fixed and movable portions of the screen 34 and are brought into intimate contact with all of the nuts within the chamber 2. The gases are passed upwardly through this chamber so that the coolest gases reach the nuts which are just about to be discharged and take up the heat contained in these nuts. As the gases pass upwardly they cool the nuts nearer the top of the chamber 2 until they are exhausted through the pipe 40 leading from the top of the chamber 2. The pipe 40 is divided into two parts 24 and 20, and the passage of the gas is controlled by two valves, one valve 42 in the pipe 24 and another 44 in the pipe 20, which makes it possible to control the relative amount of the air which will go through the heat exchanger 12 and which will be recirculated directly through the pipe 24. The nuts will be cooled most rapidly when a large volume of air is passed by them and in any single passage of the gas the amount of heat exchanged will be relatively small, therefore it is important that the gas be recirculated at a relatively high velocity. This is accomplished by the structure shown in which a relatively large portion of the gas is directly recirculated and a smaller portion is cooled gas mixed with the directly recirculated air. Obviously the direction of flow of the gas could be reversed if desired, and particularly when the nuts are handled in batches.

When practicing the process of this invention by employing the apparatus thus far described, the nuts are introduced into the chamber 2 through the gas tight feed valve 4. This valve is so arranged as to introduce a small amount of the nuts at a time and can be operated continuously rather slowly or can be operated to fill the chamber 2 in a relatively short space of time after which it is kept closed until the entire batch is discharged. However, it is preferred that the process be operated continuously and that nuts be added gradually through the feed valve 4 and removed continuously from the base of the chamber 2 through the outlet screen at 35 into the mixing chamber 30 from which they are discharged by the outlet gas-tight valve 38, which is operated at substantially the same speed as the inlet valve 4. In this manner the chamber 2 is kept substantially full of nuts at all times and the nuts introduced at the top will be at normal temperatures while those removed at the bottom can be as cold as desired and in the preferred embodiment of the invention will be at temperatures between about 0° F. and 20° F. With some types of nuts it may be found that the remainder of the process can be practiced more expeditiously if the nuts are cooled to even lower temperatures and this can be accomplished with the apparatus shown in Figure. 1.

The nuts introduced into the chamber 2 are cooled in two ways. First, by conduction and radiation of heat to the walls of chamber 2, which are cooled by the brine in the jacket 6, and second, by conduction to the air which is circulated through the nuts. For economy it will usually be found desirable to enclose all of the apparatus for cooling the nuts and the auxiliary parts, such as that shown in Figure 1 in suitable non-conducting coverings of the type well known in the art to prevent the passage of heat from the outside into the colder portions of the apparatus. The cooled air in the mixing chamber 30 is passed upwardly as indicated through the turbulence throat 32 which is a restricted portion that causes a high velocity for the gas at that point. Immediately thereafter the gas expands and is spread out over the entire bottom area of the screen 34 which supports the nuts within the chamber 2. The cooled air is thus brought into immediate contact with the nuts by passing through the screen 34 and the outlet screen 35. This cooled air absorbs the heat in the nuts and cools them to temperatures approximating that of the gas. As the gas rises in the chamber, it gradually absorbs heat until it is substantially warmer than when introduced at the bottom, while in the meantime the nuts themselves have been cooled. The warm air is withdrawn from the top of the chamber through the pipe 40 by a suction fan or blower (not shown) if desired, and the major portion of the air will be passed downwardly through the pipe 24 by opening the valve 42 and return to the chamber 2 after mixing with the air introduced at the nozzle 26. In the meantime, a portion of the recirculated air will have gone through the pipe 20 by opening the valve 44 controlling the air which goes into this pipe. In passing through the heat exchanger 12 this air will be cooled very greatly by the coiled pipe within the brine in the heat exchanger 12 so that the air exiting from the heat exchanger 12 and going into the blower 22 will be at a very low temperature. This air when discharged into the pipe 24 through the nozzle 26 will be slightly warmed but in the meantime will have cooled the recirculating gases in the pipe 24 to a substantially lower temperature and the mixed gases will repeat the cycle until the nuts near the bottom of the chamber 2 will have been cooled to the desired temperature when they may be discharged by lowering the outlet screen 35 until a certain amount of the nuts have been discharged into the mixing chamber 30 from which they will be removed by actuating the valve 38, causing them to enter the pipe 50.

The nuts which were introduced into the chamber 2, whether wet or dry, probably had the kernels rather tightly fitted into their sockets so that when the nuts were shaken no sound was forthcoming. However, when the nuts had been cooled in the manner described to the temperatures indicated, the kernels seem to have separated from the socket and if they are now shaken, a rattling sound will be heard, in some cases. This may be due in part to a shrinkage in the size of the kernel and also the contraction of the shell wall as described. The shell, embrittled by the cooling treatment, is more frangible than the uncooled nut and can be readily broken or shattered without crushing the kernel. After the nuts have been cooled in the manner above described or by any other procedure which will accomplish this result, and while still cooled they are cracked by the application of a blow to the surface of the shell.

Figure 2:
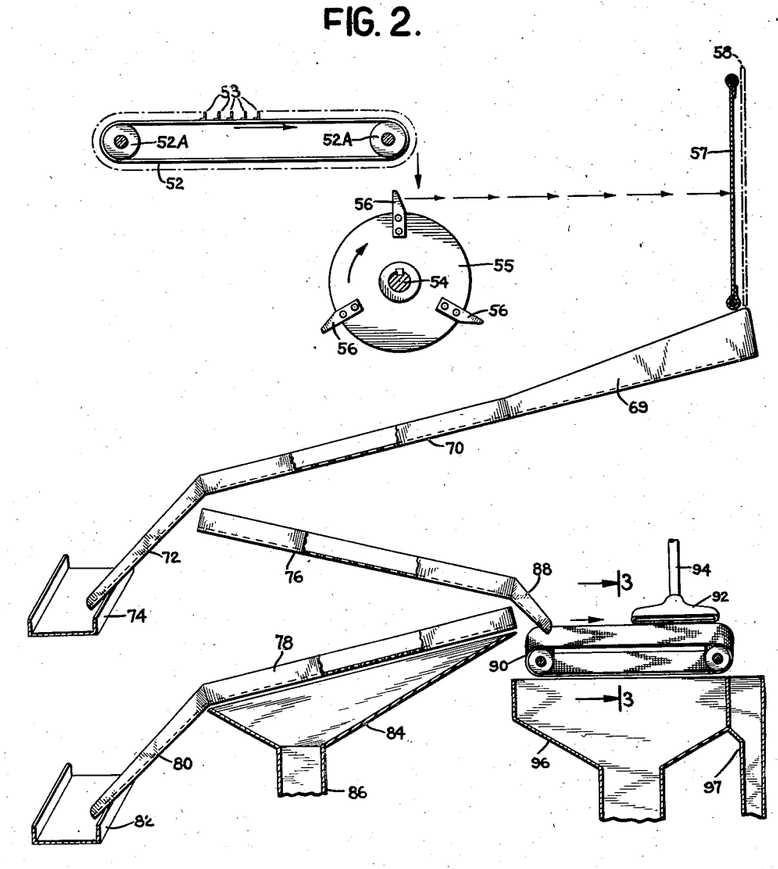
Figure 2 is a view in elevation of a cracking and screening apparatus.
Figure 4:
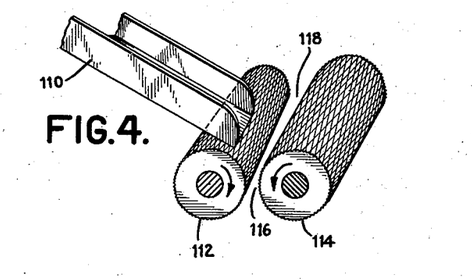
Figure 4 is a perspective view of an alternative construction for the cracking apparatus shown in Figure 2.

Figure 2 is illustrative of an apparatus that may be employed for this purpose but it is to be understood that this is simply one of the preferred means for shattering the shells, since other means, as for example, that described in Figure 4, may be substituted in Figure 2.

The conditioned nuts discharged through the pipe 50 may be directly passed to the apparatus shown in Figure 2 or an intermediate feeding mechanism may be provided. The cracking mechanism comprises a feeding belt indicated with the reference numeral 52 on which are spaced cleats 53 separated a distance sufficient to receive a nut between each of the cleats with the long axis of each nut across the belt. The belt 52 is adapted to be driven on pulleys 52a by a source of power, not shown. The nuts positioned between the cleats 53 are conveyed to the right as shown in Figure 2 until they reach the end when they drop from the cleats as indicated by the arrow. Beneath the belt 52 is a driven shaft 54 positioned slightly behind the right extremity of the belt 52 and the cleat 53. Mounted on the shaft 54 is a wheel 55 provided, in the modification illustrated in Figure 2, with three projections 56 in the form of paddles having a beveled front face. The shaft 54, to which the wheel 55 is keyed, should be provided with means for rotating the shaft at varying speeds from approximately 500 R. P. M. to as high as 2000 R. P. M. Each of the paddles or projections 56 are bevelled to an extent such that when a particular paddle is in the position beneath the extreme end of the belt 52, it will be substantially vertical so that a nut in dropping from the belt 52 is struck by the rapidly rotating paddle 56 with a very sharp impact that projects the nut in the direction indicated by the arrow to a back-stop 57. For the cracking operation, the back-stop 57 may conveniently be simply a relatively heavy piece of fabric against which the cracked nut, comprising halves of shells and whole kernels, is impinged. Since the nuts have been struck by a sharp impact by the paddle 56, they are cracked at this point and the back-stop 57 is simply to break their flight and cause them to fall down into the apron 69. Preferably the wheel 55 and back-stop 57 are enclosed in a common casing to catch the cracked nuts which are not directed toward the back-stop 57.

The mechanism just described in connection with Figure 2 can also be successfully employed for dehusking the nuts, in which case, the unconditioned nuts having their husks intact, are positioned on the belt 52, spaced by the cleats 53, and fed to the rotating wheel 55, the paddles 56 of which strike against the falling nuts. When dehusking it is generally preferable to substitute a more rigid back-stop for the back-stop 57, as for example, a steel plate 58. In this manner the nuts carrying husks are given two blows to insure removal of the husks, namely, by striking them with paddle 56 and also when the nut strikes the rigid stop 58. Since the shells have not been conditioned, they withstand the two blows without cracking. As a general rule, it is unnecessary and in many instances undesirable to use a rigid back-stop 58 when cracking nuts because the nuts are cracked by the impingement of the paddle 56, and the rigid stop 58 has a tendency to break the kernels without particularly assisting in the separation of the shells from the kernels.

The rotating wheel 55, illustrated in Figure 2 and provided with three paddles 56, has been successfully used with a wheel of a diameter of approximately 18 inches where the paddles 56 projected therefrom a distance of about 2½ inches and have a slight bevel. Other forms of wheel have been used, as for example, an 18 inch wheel with two paddles. Where three paddles were employed with old dry nuts speeds of approximately 800 R. P. M. were most successful. For fresh wet nuts, 1000 R. P. M. was required. With two paddles, a higher speed could be employed. With smaller wheels, the speed is, as a general rule, increased, in order that the velocity of the paddle when striking the nut will be substantially the same as in the case of the 18 inch wheel rotating at the speeds indicated. It will be evident, of course, that variations may be made in the arrangement and construction of the wheel 55 and paddles 56, as will be evident to those skilled in the art.

It has also been found that this cracking apparatus may be employed with some measure of success on nuts of the type described which have been very carefully and completely seasoned and dried, but while the shells can be cracked the kernels are broken, bruised and shattered permitting oxidation and rancidifying of the contained oils. Separation of broken shell and kernel is more difficult.

The broken shells together with the kernels are discharged by the apron 69 onto a screen 70, the meshes of which are large enough to permit a kernel to pass through but which will retain the larger portions of shell, most of which are halves. It is generally desirable that the screen 70 be given an oscillating motion by a mechanism, not shown, in order that the kernels will fall through the screen while the larger pieces of shell will be shaken along the inclined surface until they are discharged to the trough 72 into a receiving trough 74 which will convey the larger pieces of shell to storage piles or for other disposition. Upon the screen 76 will be discharged the kernels from the screen 70 and those pieces of shell not larger than the size of the kernel. The screen 76 is likewise agitated or given an oscillating motion by a mechanism, not shown. It is made of a screen of such mesh as will retain all of the kernels and those portions of the shell approximating the size of the kernels. Therefore, the smaller pieces of shell will drop through and be discharged onto another screen 78 through which the fines will pass and the coarser particles will be discharged onto a trough 80 which will carry the small shell particles to a conveyor trough
82. The fines will be collected in a hopper 84 and discharged through a chute 86.

Figure 3:
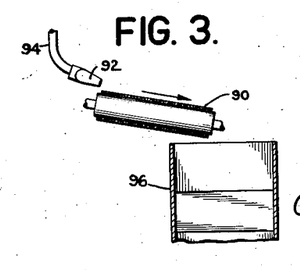
Figure 3 is a fragmentary view partly in section taken on the lines 3—3 looking in the direction of the arrows of Figure 2.

The kernels and shells of approximately the same size retained by the screen 76 will be discharged through an apron 88 to a belt 90. This belt 90 is preferably made of a screen-like material or of small links in order that it will have a surface upon which the jagged edges of the broken shell can firmly attach themselves and over which they will not slide. The belt 90 is set at an angle as shown in Figure 3 and near the upper edge thereof is a nozzle 92 from which air, supplied through a pipe 94, is discharged. As the kernels and shells travel along the inclined belt 90 the relatively smooth and round kernels will tend to roll off the side of the belt into the receptacle 96 while the shells being relatively flat with many jagged edges will tend to attach themselves to the belt and will not slide or roll along the inclined surface. However, some of the kernels may not roll by themselves but when they reach the area controlled by the nozzle 92, a jet of air discharged through the nozzle under pressure will tend to roll the kernels and force them off the side of the belt but the air pressure can be so controlled that the shells will not be dislodged but will continue on the belt until discharged from the end thereof into a suitable receptacle 97 to receive the shells.

According to the teachings of this invention as exemplified in Figure 2, the conditioned nuts are broken to separate the kernels and the shells and the cracked nuts are thereafter separated into shells of three sizes, namely, the relatively large pieces, principally halves, the small pieces and the pieces approximating the size of the kernels as well as the very small fines and also the kernels are cleanly separated from all of the shells.

The process described in connection with Figure 2 permits the separation of the kernels and shells without wetting either of them. It has heretofore been suggested to separate nut kernels from the shells by means of a brine and this process may be employed in connection with certain features of my nut cracking process but is not as convenient as that shown in Figure 2 because, by the brine method, the shell and the kernel must be wet and this may be undesirable in connection with later processing of either the kernels or the shells.

In Figure 4 is illustrated an alternative construction for cracking the nuts after they have been conditioned. The cooled nuts may be discharged from any type of conveyor, such as, for example, the trough 110 to the upper surface of a pair of rolls. The rolls are arranged so that their distances apart vary in progressing away from the end to which the trough 110 feeds. In the form illustrated, this is attained by using a tapered roll 112 and a cylindrical roll 114. The rolls are spaced so that at one end the distance between them, at 116, is slightly less than the smallest dimension of the smallest nut found in a given batch of nuts. At the other end 118, they are spaced a distance slightly smaller than the smallest dimension of the larger nuts in a batch. The surfaces of the rolls 112 and 114 are roughened slightly so that as they rotate in the direction indicated by the arrows they will tend to grab the nuts and force them between the rolls. This will not occur however except where the nuts are just larger than the opening between the rolls and in this manner the nuts will gradually work toward the larger opening where they will be grabbed by the rolls and forced between them to crack the shells. In this manner, the nuts are selectively cracked without undue crushing as would be the case were the rolls spaced apart the same distance along the entire length in which case any adjustment would satisfy only a particular nut while the smaller nuts would go through without cracking and the larger nuts might be severely crushed so as to break the kernels as well.

Figure 5:
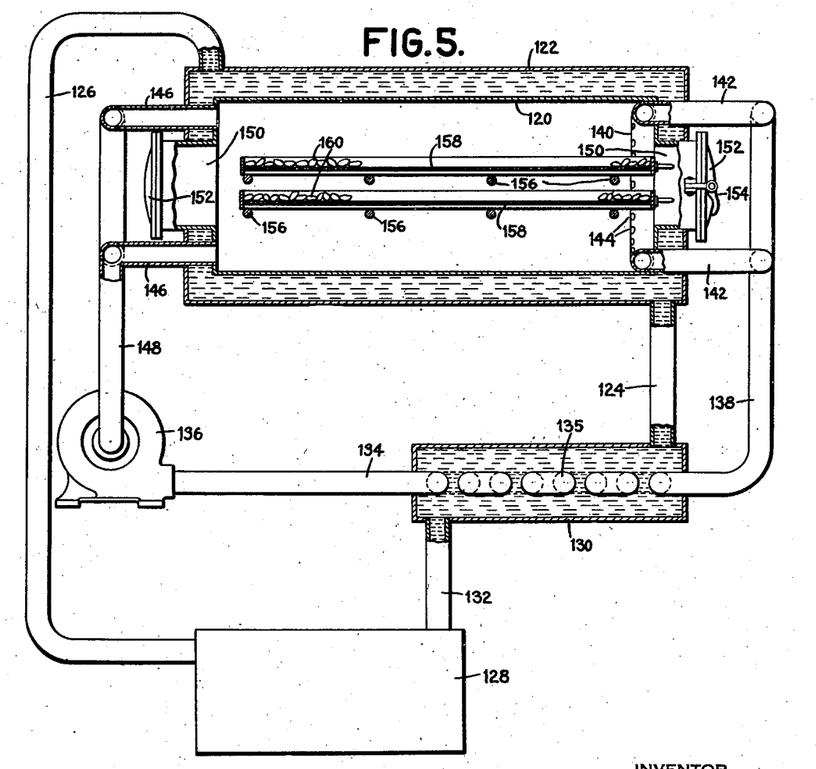
Figure 5 is a view in elevation with certain portions in section of an alternative construction to that shown in Figure 1 of a conditioning apparatus.

Figure 5 illustrates an embodiment of the invention in an apparatus which may be substituted for that shown in Figure 1 and is particularly useful for cooling the nuts to condition them. This apparatus comprises a chamber 120 that may be of any desired shape but provided with a jacket 122 to receive a cooling brine from an inlet pipe 124. This brine having taken up heat in the jacket 122 from the nuts in the chamber 120 is discharged through an outlet brine pipe 126 which supplies it to a refrigeration apparatus 128 in which it is again cooled before passing through a heat exchanger 130 by a connecting conduit 132. In the heat exchanger the brine serves to cool the air passing therethrough in coiled pipes 134 before returning to the jacket 122 of the chamber 120 through the pipe 124.

Means are also provided to supply cold air to the chamber 120 in order that there my be direct contact between the cool air and the nuts within the chamber 120. This is accomplished by a blower or fan 136 which forces air through the pipe 134 and its coiled portion 135 within the heat exchanger 130 through a pipe 138 which connects with a header 140 by pipes 142. Apertures 144 in the header 140 distribute the cooled air uniformly throughout the chamber 120 for intimate contact with the nuts in the chamber. When the air has absorbed the heat from the nuts in the chamber 120, it is removed through the pipes 146 connected with the suction side of the blower or fan 136 by a pipe 148.

In Figure 5 openings have been shown at each end of the chamber 120 although a single opening at one end would be sufficient in many instances. These openings, identified as 150, are closed by covers 152 which may be held in place by any suitable fastening means 154.

Within the chamber 120 may be provided a plurality of supports 156 to position trays 158 within the chamber. These trays 158 are made of a foraminous material so that nuts 160 supported on the trays can be reached on all sides by the air passing through the chamber.

While the apparatus shown in Figure 5 is particularly designed for a batch process, it could be readily modified to be used in connection with a continuous process wherein belts or the like were substituted for the trays 158 or in which the trays were continuously moved through chambers. In this construction, the covers 152 would be replaced by suitable air locks which would permit the continuous passage of the trays or belts through them. Likewise, a plurality of chambers 120 might be set in series so that the nuts on the trays 158 or on belts serving a similar purpose would carry the nuts to chambers of the type of 120 which were maintained at progressively lower temperatures in order that the nuts might be cooled in a stepwise manner as they progressed through the several chambers.

It will be noted that the relative flow of the brine and air in the apparatus shown in Figures 1 and 5 vary but it will be understood that these air and brine circulating systems are mutually interchangeable. Furthermore, certain features of one could be combined with the other, as for example, in Figure 1 the blower or fan 22 is shown between the heat exchanger 12 and the inlet nozzle 26 while in Figure 5 the blower is shown between the outlet conduit from the chamber 120 and the inlet to the heat exchanger 130. Obviously one or both of these could be employed in any given construction.

It will thus be seen that I have provided a method whereby nuts of the cohune variety which heretofore could not be satisfactorily cracked by commercial processes can readily be cracked without damaging the kernels within the nuts. Likewise, this invention provides an apparatus which may be used for carrying out the process described. While certain preferred embodiments of the invention, as exemplified in the process and apparatus described, have been given, it is to be understood that these are not to be considered as limiting the invention but illustrative of it, the scope of the invention being set forth in the appended claims.

What is claimed is:

1. The process of extracting the kernels from substantially impenetrable palm nuts of the cohune variety comprising conditioning the nuts by cooling said nuts to a sufficient temperature below 32° F. and for a sufficient length of time to embrittle the shells and make them frangible, shattering the frangible shells and separating the kernels from the broken shells.

2. The process for extracting the kernels from substantially impenetrable palm nuts of the cohune variety comprising conditioning the nuts by cooling said nuts to a sufficient temperature below 32° F. and for a sufficient length of time to embrittle the shells and make them frangible, subjecting the frangible shells to pressure deformation and separating the kernels from the broken shell.

3. The process for extracting the kernels from substantially impenetrable palm nuts of the cohune variety comprising conditioning the nuts by cooling said nuts to a sufficient temperature below 32° F. and for a sufficient length of time to embrittle the shells and make them frangible, subjecting the frangible shells to impact deformation and separating the kernels from the broken shell.

4. The process for extracting the kernels from substantially impenetrable palm nuts of the cohune variety comprising passing a refrigerated gas at a temperature of below 32° F. over the nuts for a sufficient length of time to reduce their temperature and make the shells frangible, shattering the frangible shells, and separating the kernels from the broken shell.

5. The process for extracting the kernels from substantially impenetrable palm nuts of the cohune variety comprising conditioning said nuts by the radiation of heat therefrom to a colder body and by passing a cooled gas over the nuts for a sufficient length of time to reduce their temperature below 32° F. and make the shells frangible, shattering the frangible shells, and separating the kernels from the broken shell.

6. In the process of extracting the kernels from substantially impenetrable palm nuts of the cohune variety, the process comprising conditioning the kernels and the shells which includes reducing the temperature of the nuts by removing heat therefrom until the nuts are at a temperature sufficiently below 32° F. to make the shells frangible and to harden the kernels to withstand the shock of shattering the shells without shattering the kernels, and shattering the shells.

7. In the process for extracting the kernels from substantially impenetrable palm nuts of the cohune variety, the process comprising conditioning the kernels and shells which includes passing a refrigerated gas at a temperature of below 32° F. over the nuts for a sufficient length of time to reduce the temperature of the shells more rapidly and to a greater extent than the kernels to embrittle and make the shells frangible and to harden the kernels to withstand the shock of shattering the shells without shattering the kernels, and shattering the shells.

8. In the process for extracting the kernels from substantially impenetrable palm nuts of the cohune variety, the step of conditioning the kernels and shells which comprises reducing the temperature of the nuts by removing heat therefrom until the shells have attained a temperature of between about 20° F. and −20° F. to make them frangible and to harden the kernels to withstand the shock of shattering the shells without shattering the kernels and shattering the shells.

9. In the process for extracting the kernels from substantially impenetrable palm nuts of the cohune variety, the step of conditioning the kernels and shells which comprises reducing the temperature of the shells to between about 20° F. and −20° F. more rapidly and to a greater extent than the kernels, to embrittle and make the shells frangible and to harden the kernels to withstand the shock of shattering the shells without making them brittle and shattering the shells.

10. The process for extracting the kernels from substantially impenetrable palm nuts of the cohune variety comprising conditioning the nut by cooling said nut to a sufficient temperature below 32° F. and for a sufficient length of time to embrittle the shell and make it frangible and striking a free nut with a sharp impact.

11. The process for extracting the kernels from substantially impenetrable palm nuts of the cohune variety comprising conditioning the nut by cooling said nut to a temperature below 32° F. to embrittle the shell and make it frangible, dropping the conditioned nut freely through space and striking the falling nut with a sharp impact.

12. The process for extracting the kernels from substantially impenetrable palm nuts of the cohune variety comprising conditioning the nut by cooling said nut to a temperature below 32° F. to embrittle the shell and make it frangible, dropping the conditioned nut freely through space and striking the falling nut with a sharp impact delivered substantially at right angles to the path of the falling nut.

13. The process for extracting the kernels from substantially impenetrable palm nuts of the cohune variety comprising conditioning the nut by cooling said nut to a temperature below 32° F. to embrittle the shell and make it frangible, dropping the conditioned nut freely through space and striking the falling nut with a sharp impact delivered substantially at right angles to the path of the falling nut, to project the cracked nut against a back-stop.

14. The process for extracting the kernels from substantially impenetrable palm nuts of the cohune variety comprising conditioning the nut by cooling said nut to a temperature below about 20° F. to embrittle the shell and make it frangible, dropping the conditioned nut freely through space and striking the falling nut with a sharp impact delivered substantially at right angles to the path of the falling nut, to project the cracked nut against a back-stop.

15. The process for extracting the kernels from substantially impenetrable palm nuts of the cohune variety comprising conditioning the nut by subjecting the nut to a cooling treatment comprising passing a cooled gas over the nut until the shell has reached a temperature below about 20° F. while the kernel is still at a slightly higher temperature whereby the shell is embrittled and the kernel strengthened to withstand cracking of the now frangible shell, dropping the conditioned nut freely through space, striking the falling nut with a sharp impact delivered substantially at right angles to the path of the falling nut, to project the cracked nut against a collecting back-stop and separating the kernels from the broken pieces of shell.

16. In the process of extracting the kernels from substantially impenetrable palm nuts of the cohune variety, in combination, the steps of conditioning the nut by subjecting the nut to a sufficient temperature below 32° F. and for a sufficient length of time to embrittle the shell and make the shell frangible and cracking the frangible shell.

17. In the process of extracting the kernels from substantially impenetrable palm nuts of the cohune variety, in combination, the steps of conditioning the nut by subjecting the nut to a sufficient temperature below 32° F. and for a sufficient length of time to embrittle the shell and make the shell frangible and harden the kernel and cracking the frangible shell.

18. In the process of extracting the kernels from substantially impenetrable palm nuts of the cohune variety, in combination, the steps of conditioning the nut by subjecting said nut to a sufficient temperature below 32° F. and for a sufficient length of time to embrittle the shell and make the shell frangible and establish clearance between the shell and the kernel and cracking the frangible shell.

19. In the process of extracting the kernels from substantially impenetrable palm nuts of the cohune variety, in combination, the steps of conditioning the nut by subjecting said nut to a sufficient temperature below 32° F. and for a sufficient length of time to embrittle the shell and make the shell frangible and harden the kernel and establish clearance between the shell and the kernel and cracking the frangible shell.

20. In the process of extracting the kernels from substantially impenetrable palm nuts of the cohune variey, in combination, the steps of conditioning the nut by subjecting said nut to a sufficient temperature below 32° F. and for a sufficient length of time to embrittle the shell and make the shell frangible and subjecting the frangible shell to the force of impact to crack the shell.

21. In the process of exracting the kernels from substantially impenetrable palm nuts of the cohune variety, in combination, the steps of conditioning the nut by subjecting said nut to a sufficient temperature below 32° F. and for a sufficient length of time to embrittle the shell and make the shell frangible, delivering a conditioned nut to a predetermined position and subjecting the frangible shell to the force of impact to crack the shell.

22. In the process of extracting the kernels from substantially impenetrable palm nuts of the cohune variety, in combination, the steps of striking a nut with a blow to project it through space to disrupt the husk, separating the husk from the nut and then conditioning the nut by subjecting the nut to a sufficient temperature below 32° F. and for a sufficient length of time to embrittle the shell and make the shell frangible and cracking the frangible shell.

23. In the process of extracting the kernels from substantially impenetrable palm nuts of the cohune variety, in combination, the steps of delivering a nut to a predetermined position, subjecting the nut to the force of impact to loosen and break the husk, separating the nut from the husk, conditioning the nut separated from its husk by subjecting said nut to a sufficient temperature below 32° F. and for a sufficient length of time to embrittle the shell and make the shell frangible and cracking the frangible shell.

24. In the process of extracting the kernels from substantially impenetrable palm nuts of the cohune variety, in combination, the steps of delivering a nut to a predetermined unsupported position, subjecting the unsupported nut to the force of impact to loosen and break the husk, separating the nut from the husk, conditioning the nut separated from its husk by subjecting said nut to a sufficient temperature below 32° F. and for a sufficient length of time to embrittle the shell and make the shell frangible and cracking the frangible shell.

25. In the process of extracting the kernels from substantially impenetrable palm nuts of the cohune variety, in combination, the steps of delivering a nut to a predetermined unsupported position, subjecting the unsupported nut to the force of impact to project the nut against a rigid back-stop to loosen and break the husk, separating the nut from the husk, conditioning the nut separated from its husk by subjecting said nut to a sufficient temperature below 32° F. and for a sufficient length of time to embrittle the shell and make the shell frangible and cracking the frangible shell.

26. In the process of extracting the kernels from substantially impenetrable palm nuts of the cohune variety, in combination, the steps of conditioning the nut by cooling the nut sufficiently to cause the oil in the kernel to solidify and the kernel to harden and thereby making the kernel resistant to impact and bruising while the shell becomes embrittled and frangible, said cooling causing the shell wall to contract, thereby increasing the size of the kernel cavity and establishing a clearance between the kernel and the shell wall, and cracking the frangible shell, whereby the shell and kernel readily separate after the shell is cracked.

KARL M. JONES.